United States Patent
Profendiner et al.

(10) Patent No.: US 10,643,470 B2
(45) Date of Patent: May 5, 2020

(54) METHOD FOR ASSISTING A DRIVER OF A MOTOR VEHICLE WITH RESPECT TO AN IMMINENT OVERTAKING MANEUVER, AND MOTOR VEHICLE

(71) Applicant: Audi AG, Ingolstadt (DE)

(72) Inventors: Daniel Profendiner, Ingolstadt (DE); Torsten Schön, Pietenfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/060,706

(22) PCT Filed: Nov. 16, 2016

(86) PCT No.: PCT/EP2016/077815
§ 371 (c)(1),
(2) Date: Jun. 8, 2018

(87) PCT Pub. No.: WO2017/097555
PCT Pub. Date: Jun. 15, 2017

(65) Prior Publication Data
US 2018/0365996 A1    Dec. 20, 2018

(30) Foreign Application Priority Data
Dec. 8, 2015    (DE) .................. 10 2015 015 944

(51) Int. Cl.
*G08G 1/0968*    (2006.01)
*G08G 1/01*    (2006.01)
(Continued)

(52) U.S. Cl.
CPC . *G08G 1/096827* (2013.01); *B60W 30/18163* (2013.01); *G01C 21/3697* (2013.01);
(Continued)

(58) Field of Classification Search
None
See application file for complete search history.

(56) References Cited

U.S. PATENT DOCUMENTS

2017/0154529 A1*    6/2017    Zhao ................. B60W 30/12
2018/0322782 A1*    11/2018    Engel ............... G08G 1/096741

FOREIGN PATENT DOCUMENTS

DE    10029816 A1    1/2002
DE    10255331 A1    6/2004
(Continued)

OTHER PUBLICATIONS

International Search Report and Written Opinion directed to related International Patent Application No. PCT/EP2016/077815, dated Feb. 16, 2017, with attached English-language translation; 32 pages.
(Continued)

*Primary Examiner* — Christian Chace
*Assistant Examiner* — Kyung J Kim
(74) *Attorney, Agent, or Firm* — Sterne, Kessler, Goldstein & Fox P.L.L.C.

(57) ABSTRACT

A method for assisting a driver of a motor vehicle regarding an imminent overtaking maneuver by a driver assistance system, wherein the suitability of an overtaking process, which is ascertained from overtaking information, is output to a driver To determine the overtaking information, route data which relates to route sections and which influences the evaluation of the suitability of an overtaking process on a route section is ascertained by a plurality of data acquiring motor vehicles during a driving process along a route and is received by a vehicle-external central computing device. The route data assigned to a route section by each different motor vehicle is statistically evaluated to determine the overtaking information relating to the route section. The
(Continued)

Figure 1:
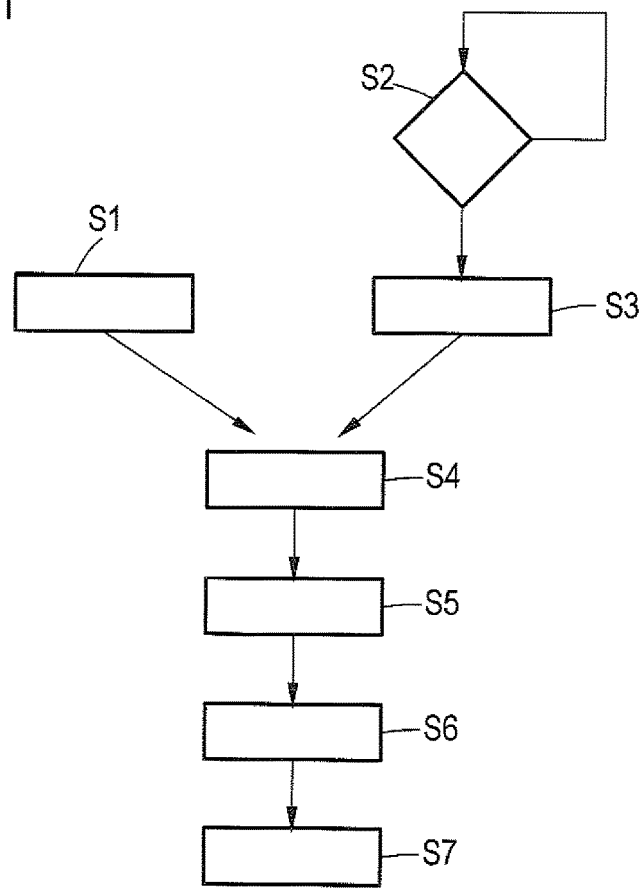

overtaking information is provided to all of the motor vehicles which have a driver assistance system.

18 Claims, 2 Drawing Sheets

(51) Int. Cl.
    *G08G 1/0962*     (2006.01)
    *G08G 1/0967*     (2006.01)
    *G01C 21/36*     (2006.01)
    *G08G 1/16*     (2006.01)
    *B60W 30/18*     (2012.01)

(52) U.S. Cl.
    CPC ......... *G08G 1/0112* (2013.01); *G08G 1/0129* (2013.01); *G08G 1/0141* (2013.01); *G08G 1/09626* (2013.01); *G08G 1/096716* (2013.01); *G08G 1/096758* (2013.01); *G08G 1/096775* (2013.01); *G08G 1/096833* (2013.01); *G08G 1/164* (2013.01)

(56) References Cited

FOREIGN PATENT DOCUMENTS

| | | | |
|---|---|---|---|
| DE | 102007012181 A1 | 9/2008 | |
| DE | 102010008071 A1 | 4/2011 | |
| DE | 102013013799 A1 | 2/2015 | |
| DE | 102014205391 A1 | 9/2015 | |
| EP | 1045224 A2 | 10/2000 | |
| EP | 1652128 A2 * | 5/2006 | ......... G06Q 30/0283 |
| EP | 1652128 A2 | 5/2006 | |
| WO | WO 2006/037360 A1 | 4/2006 | |

OTHER PUBLICATIONS

International Preliminary Report on Patentability directed to related International Patent Application No. PCT/EP2016/077815, completed Mar. 16, 2018, with attached English-language translation; 11 pages.

\* cited by examiner

METHOD FOR ASSISTING A DRIVER OF A MOTOR VEHICLE WITH RESPECT TO AN IMMINENT OVERTAKING MANEUVER, AND MOTOR VEHICLE

TECHNICAL FIELD

The present invention refers to a method for assisting a driver of a motor vehicle with respect to an imminent overtaking maneuver by means of a driver assistance system, wherein the suitability of an overtaking process, which is ascertained from overtaking information, with respect to an overtaking maneuver, is output to a driver in a manner relating to the route section. The invention also refers to a motor vehicle.

BACKGROUND

The estimation of overtaking possibilities while driving on country roads often represents a very difficult task for the driver planning an overtaking maneuver. Thus, it is not only possible that the driver may fundamentally avoid overtaking maneuvers, but it is also conceivable that the driver may make wrong decisions, which may lead to more critical driving situations, in particular the interruption of the overtaking maneuver. In particular, the driver of a motor vehicle lacks any knowledge about which route sections are particularly suitable for overtaking if the route is unknown. It may also occur that riskier overtaking maneuvers are performed shortly before reaching a following route section, which is much more suitable for an overtaking maneuver.

Even when the driver uses a map representation of a navigation system of a motor vehicle, in order, for example, to recognize a following "long straight section", said problems remain unsolved, since long straight route sections may also be extremely hilly, so that the visual range is limited, despite the straight form of the road, and elongated curves may be better suited for an overtaking despite their curved form, if no construction site exists along the road track and the curves are thus always visible.

In the state of the art, driver assistance systems have already been proposed, which assist the driver at selecting good points in time for performing overtaking maneuvers. It is known, for example, to evaluate driving situation data, acquired on the motor vehicle, which describe the current driving situation, in order to generate an overtaking recommendation. Moreover, it has been proposed to determine and output overtaking tips or information regarding the suitability of a route section for overtaking, from a vehicle-internal navigation system. Thus, DE 10 2010 008 071 A1 for example proposes to determine route sections ahead of the motor vehicle having characteristics relevant to overtaking maneuvers, and to output the information regarding at least one route section with characteristics relevant for overtaking processes to the vehicle driver. The instant of information output may in particular be chosen in such a way that the driver is timely informed about the possibility of an overtaking maneuver.

However, in this case, a problem arises in that the navigation data to be evaluated do not provide any information about whether a following route section is more suitable for an overtaking maneuver. In fact, in digital map data of a navigation system important information regarding a correct evaluation of route sections is [[are]] missing, since ultimately the same analysis performed by the driver "looking" at the map is automated.

DE 102 55 331 A1 refers to a driver information system for informing the driver of a vehicle regarding the characteristics of route sections of a traveling route, which are placed in front of the vehicle when viewed in the driving direction with respect to a vehicle location, wherein the idea is that the characteristics of the route sections have to comprise characteristics of the route sections which are relevant for the overtaking processes. Thus, a timely information regarding overtaking possibilities along its travel route is provided to the driver of the vehicle.

BRIEF DESCRIPTION OF DRAWINGS/FIGURES

Figure 2:
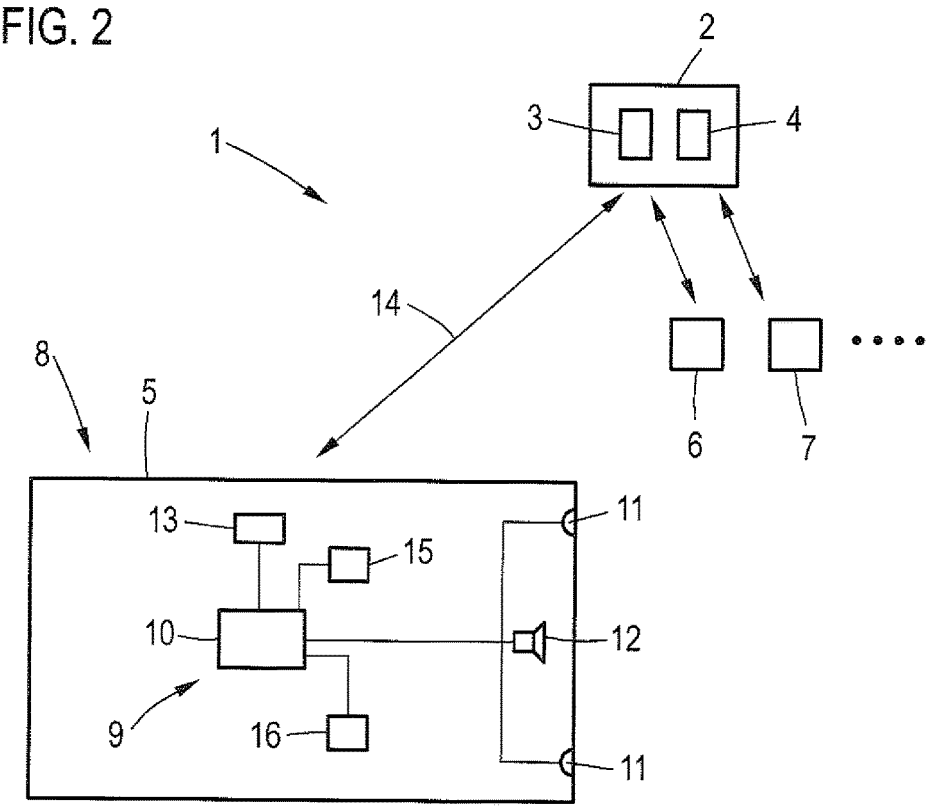
Figure 3:
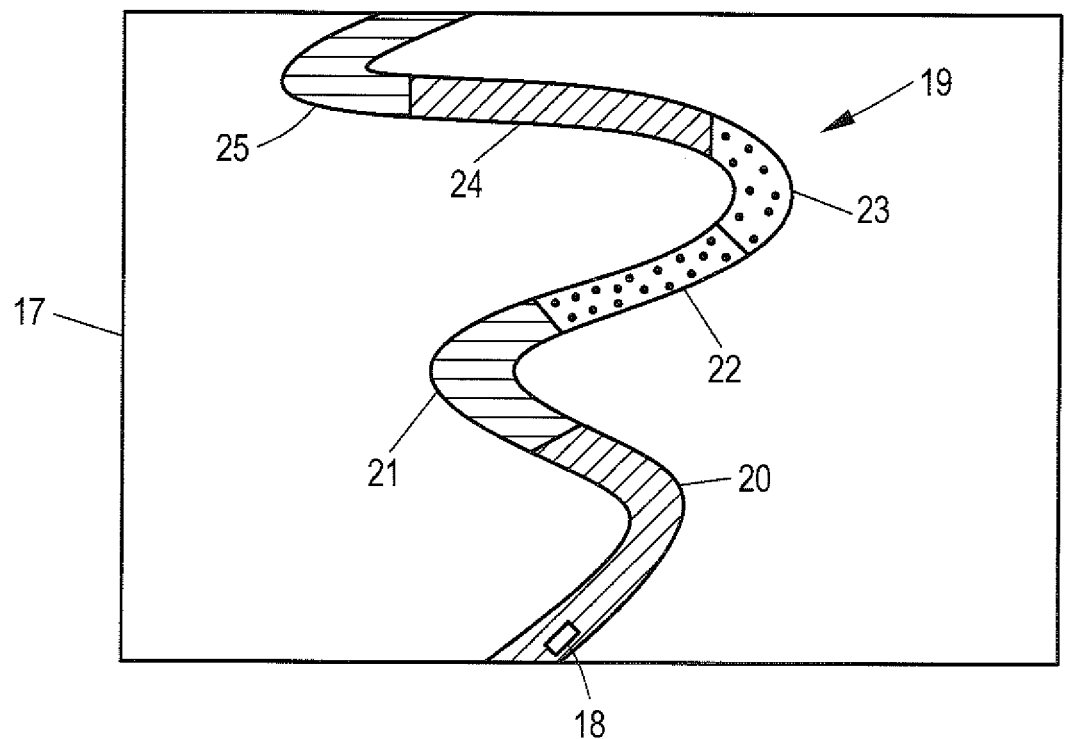

FIG. 1 shows a flow chart of an exemplary embodiment for determining overtaking information, FIG. 2 shows a system for performing the inventive method, and FIG. 3 shows a map representation of overtaking information.

DETAILED DESCRIPTION

The object of the invention is thus to provide an improved information basis for a driver assistance system for the assisting in overtaking maneuvers.

This object is achieved according to embodiments of the invention in a method of above said type by the characteristics of an embodiment described herein.

In an embodiment, to determine overtaking information, route data which at least partly relate to route sections and which influence the evaluation of the suitability of an overtaking process on a route section are ascertained by a plurality of data receiving motor vehicles during a driving process along a route and transmitted to a motor vehicle-external central processing device.

The route data assigned to a route section of each different motor vehicle are statistically evaluated in order to ascertain the overtaking information relating to the route section.

Overtaking information is provided to all of the motor vehicles which have a driver assistance system for assisting the driver with respect to an imminent overtaking maneuver.

According to the invention it is thus proposed that within the motor vehicles of a fleet, thus within the data acquisition motor vehicles, while driving these motor vehicles, realistic useful information is collected, which is transmitted as route data to a central computing device, in particular a server, where this information is centrally collected and may be used for ascertaining extremely precise and realistic overtaking information, in particular an overtaking suitability value for individual route sections. In particular all motor vehicles provided with a driver assistance system for assisting the driver of a motor vehicle regarding imminent overtaking maneuvers may be used as data acquisition motor vehicles, and/or the data acquisition motor vehicles are all provided with a driver assistance system for assisting the driver of the motor vehicle with respect to imminent overtaking maneuvers. In other words, the use as a data acquisition motor vehicle and the presence of a driver assistance system for overtaking maneuver assistance may be coupled to each other; exemplary embodiments may however also be envisaged, in which also motor vehicles, which are not provided with such a driver assistance system, may collect route data, if the corresponding apparatus for acquiring route data is present on the data acquisition motor vehicle. For example, all motor vehicles of a manufacturer, which are provided with the suitable data acquisition equipment or similar may be used as data acquisition motor vehicles.

The route data obviously contain an information which allows an association with the route sections, wherein for example the route data may convey a current position of the data acquisition motor vehicle, such as a position determined by a GPS sensor. A particularly advantageous embodiment of the present invention also envisages that the route data also comprise a driving direction, wherein, preferably, the overtaking information is determined with respect to the driving direction. This is based on the finding that often overtaking conditions may be different in different driving directions.

Overall, it can therefore be said that route data on the central computing device, which may also be called a backend, are associated to the corresponding route sections. If now the route data are statistically evaluated for certain route sections, which originate from different data acquisition motor vehicles, an information regarding the suitability of overtaking is formed, since the route data certainly allow an evaluation of the overtaking suitability on the route section. It is preferred when an overtaking information composed of an overtaking suitability value is ascertained for the different route sections. Such overtaking information may for instance be easily stored on digital map data, so that in a preferred embodiment of the present invention the overtaking information is stored in association with the route sections in digital map data of a navigation system of the motor vehicle. This is particularly advantageous when the various routes in the digital map data are already subdivided into route sections, wherein obviously a different/further subdivision may be performed, which nonetheless may be stored as an association into digital map data, such as an additional attribute of a route length defined in the digital map material being a subdivision of the route length into route sections.

Upon each update and/or on a regular basis, the current overtaking information is transmitted to motor vehicles provided with a driver assistance system for assisting the driver with respect to imminent overtaking maneuvers, so that this information may be correspondingly used therein. Ultimately, the motor vehicle is provided with a route profile, which forms the basis, for example, for a recommendation which is output to the driver.

In this way the safety during overtaking processes is increased and the risk of accidents is reduced. Due to the possible improved assistance by the driver assistance system, the driver feels more comfortable and confident about her surroundings. This in particular also causes a reduction of stress and thus of the number of risky overtaking maneuvers.

It is to be noted that the overtaking information may be used not only in the driver assistance system but also for example in the analysis of reasonable new administrative overtaking restrictions and similar.

A first embodiment of the inventive method is characterized in that the route data are determined as an information about the visual range describing the visual range of environmental sensors of the data acquiring motor vehicles directed towards the forward region along the route. It is thus checked, how far the route may be detected, thus viewed, by means of, in particular, optical sensors or environmental sensors of the motor vehicle, which require a direct line of sight, which also represents the visual capability of the driver, who would like to verify the route, in particular the opposite lane, with respect to an overtaking process. Environmental sensors are preferably considered to be optical sensors, such as cameras; however also radar sensors, laser scanners and similar may be used as environmental sensors for evaluating the visual range.

Different embodiments may thus be implemented, in order to derive the visual range from the sensor data and thus to determine the visual range information. Within the scope of the present invention the visual range information may be determined from the sensor data based on an environmental model merging sensor data of a plurality of environmental sensors and/or depending on the farthest visible object and/or depending on a maximum distance, at which the itinerary, in particular with respect to the opposite lane, may be derived. It is fundamentally possible to use a sensor data merging, in order to properly associate all characteristics detected by environmental sensors. The question about the suitability of the overtaking is ultimately determined by the visibility of the route, in particular of the opposite lane, while driving on said route. Thus, it is also preferred to use a maximum distance, at which the route, and concretely the opposite lane, may be derived from the sensor data. Ultimately any kind of complex evaluation algorithm may be used, such as those which base the evaluation of the visibility of the route or of the opposite lane not on the visibility of the corresponding road surface, but on the visibility of higher protruding objects, such as road users transiting on the opposite lane and similar.

Preferably when determining the overtaking information, a higher visual range is evaluated and displayed as more suitable for an overtaking. As already noted, a higher visual range of the environmental sensors also indicates a higher visual range of a driver when estimating the overtaking situation.

In a second embodiment according to the inventive method, the route data are determined as the operating data of the data acquiring motor vehicle determined during an overtaking maneuver of the data acquiring motor vehicle and/or maneuver data derived therefrom. This embodiment is also characterized in that the fleet of data acquisition motor vehicles record overtaking maneuvers and transmit the same to the backend, thus to the central computing device.

Thus, route sections may be determined, for example, on which overtaking is frequent. In this context it is particularly advantageous if route data are determined both for concluded and interrupted overtaking maneuvers. This means that also interrupted overtaking processes are recorded and transmitted, as route data, to the central computing device. Such route data indicate, for example, a particularly critical overtaking positions, such as on a straight road before a hilltop. Thus, the overtaking behavior of a plurality of data acquisition motor vehicles is observed, analyzed and used for determining a particularly realistic overtaking information, which is suitable for assisting the driver.

Concretely, a concluded overtaking maneuver may be recognized through an acceleration phase comprising a lane change, a further lane change and a continued operation of the motor vehicle at higher speeds with respect to prior to the overtaking maneuver and/or an interrupted overtaking maneuver may be recognized by an acceleration phase with at least an initiated lane change, followed by a strong braking phase and continued operation of the motor vehicle at a comparable speed as before the overtaking maneuver. Particularly evident indications for recognizing overtaking maneuvers in general may also be provided by observing the activation of the driving direction indicator. In particular in the context of the driving environment, in particular in case of a country road with two opposed driving lanes, turn signals may thus be advantageously taken into account. A potential overtaking maneuver may for example be analyzed by detecting if an activation of a right turn signal indicator follows an activation of a left turn signal indicator. However, the previously further operating data are preferably used for providing a general classifier for overtaking maneuvers, which is particularly broken down by concluded and interrupted overtaking maneuvers.

An advantageous embodiment in this context is that, as the overtaking information, an overtaking suitability value is determined depending on at least one evaluation variable, selected from the group comprising a relative and/or absolute number of successful and/or interrupted overtaking attempts, the maximum speed during the overtaking maneuver and the duration of an overtaking maneuver. It may also be the case that for route sections, the number of unsuccessful overtaking attempts and the number of successfully concluded overtaking maneuvers are considered, since, in particular when observing the relative numbers, clear indications regarding the overtaking suitability of the route section are obtained. Also, the maximum speed during overtaking processes and/or the duration of the overtaking processes, in particular when observed on average, ultimately describe the suitability of the overtaking for each route section. Individual evaluation variables may be used with different weights in an overtaking suitability value. Moreover, it is to be noted that also in general in the statistical observation of route data, reliability values associated thereto, such as estimated errors, may be taken into account, so that some route data are weighted more strongly than others and similar.

In order to output the overtaking information, several possibilities are given. It is thus conceivable that the overtaking information is displayed in a map representation, in particular by coloring route sections according to an overtaking suitability value. In particular, route sections, whose overtaking suitability value exceeds a first threshold value, are represented by a green color, while route sections whose overtaking suitability value drops below a second threshold are colored in red, and route sections having other overtaking suitability values are represented in yellow. Thus, a three-colored scheme (red, yellow, green) is provided, which allows the representation of the overtaking suitability. The driver may then judge the overtaking situation on her own responsibility and on this basis decide when to overtake.

In addition, or as an alternative, an overtaking probability may be determined based on current operating data of the motor vehicle and depending on the overtaking probability an overtaking recommendation may be issued on a certain route section. If for example a driver drives on a route which is hard to navigate, on which a speed of 100 km/h is allowed, although it is determined, for example based on data coming from a longitudinal guidance driver assistance system and/or on the driving speed, that the driver follows a slower road user at a lower speed, such as a speed of 70 km/h, a high probability of a desired overtaking process is present. Thus, the risk is present that the driver attempts an overtaking, although the road in this route section is difficult to see. If based on the overtaking information it is known that for example two curves ahead a long, well-visible straight track is approaching, on which an overtaking may be safely performed, a corresponding indication may be provided to the driver, as follows: "in 200 m a straight route section follows, which allows a safe overtaking". It is to be noted at this point that algorithms for determining the overtaking probability or the intention of overtaking are already basically known in the state of the art, such as regarding the evaluation of a lane change on highways and similar, which may be correspondingly used in the inventive method.

Finally, it may also be conceivable that in case an intention to overtake on an unsuitable route section preceding a more suitable route section is recognized, an overtaking warning is issued, in particular containing an indication to the following more suitable route section. Thus, if the motor vehicle is for example traveling in a particularly dangerous spot, such as on a route section with a lot of interrupted overtaking maneuvers, in case of a recognized intention to overtake (or also in general), a warning may also be output, such as "Attention, dangerous road situation, do not overtake". This output may be completed by an information about when a route section suitable for overtaking will be reached.

Further possible solutions are obviously also conceivable, in order to properly provide the driver with the knowledge about the overtaking information.

The invention, besides the method, also refers to a motor vehicle, which is provided with a communication device for communicating with a motor vehicle-external central computing device and a driver assistance system for assisting the driver of the motor vehicle with respect to imminent overtaking maneuvers, with a control device.

The control device is adapted to provide a driver with an overtaking suitability regarding an overtaking maneuver, which is determined from an overtaking information received by the computing device.

The control device is further adapted to determine, while driving along a route, route data, which are at least partially referred to route sections and which influence the evaluation of the overtaking suitability on a route section and for transmitting the same to the computing device.

Statements regarding the motor vehicles which are referred to the inventive method may obviously be transferred by analogy to the inventive motor vehicle. The vehicle is thus both adapted for use as a data acquisition motor vehicle and also for using overtaking information provided by the central computing device for better assisting the driver. Both functionalities are advantageously provided within the control device of the driver assistance system. The wireless communication link to the central computing device may in particular be provided through a mobile radio network and/or the Internet.

Further advantages and details of the present invention are obtained from the following exemplary embodiments as well as in connection with the drawings FIG. 1 shows an exemplary embodiment of the inventive method in the form of a flow chart. Steps S1, S2 and S3 represent steps for determining route data, which allow the evaluation of the overtaking suitability of a route section, within a data acquisition motor vehicle. Currently two types of route data are acquired while driving the data acquisition motor vehicle. According to step S1, the route data which are continually, cyclically and/or otherwise derived from sensor data of the environmental sensors according to a certain acquisition criterion, are visual range information describing the visual range of environmental sensors of the data acquisition motor vehicle directed towards the region in front of the data acquisition motor vehicle, along the route. To this end, in particular a sensor data function is used in a model of the surroundings, in order to determine how the environmental sensors may recognize and thus visualize the route traveled with respect to at least one opposite lane. In case of use of one model of the surroundings, the preliminary evaluations required therefor for evaluating the same are in general already made, wherein it has to be obviously ensured that information regarding the further travel path are also described or may be described by the sensor data and are not just derived from other sources, such as digital map data. Various embodiments of concrete evaluation algorithms may be conceived.

In step S2, the current operating data of the data acquisition motor vehicle are evaluated in order to assess if they indicate the occurrence of a (concluded or interrupted) overtaking maneuver. Besides the travel surroundings, in particular the activation of turn signal indicators (left turn signal followed by right turn signal) are considered, however also the driving behavior of the driver, thus if an acceleration phase with a lane change is followed by a further lane change and the operation of the motor vehicle at higher speed (concluded overtaking maneuver) or if an acceleration phase with at least one initiated lane change is followed by a stronger braking phase and continued operation of the motor vehicle substantially at the previous speed (interrupted overtaking maneuver). If in step S2 the occurrence of an overtaking maneuver is detected, in step S3 route data describing this overtaking maneuver are collected as route data, wherein in a simple case, the classification as a successful or unsuccessful overtaking maneuver may be sufficient for the route data, although preferably further information, such as regarding the speed and the traveled path, are grouped within a corresponding set of route data.

The route data collected at steps S1 to S3 are transmitted, together with the current position of the data acquisition motor vehicle at route data acquisition, which allows an association to a route section, and a driving direction data regarding the driving direction of motor vehicle at route data acquisition, to a central motor vehicle-external computing device. This takes place at step S4.

At step S5, the collected route data of a plurality of data acquisition motor vehicles, sorted by route section, are statistically evaluated. The operating data which are considered among route data of overtaking maneuvers, in particular the absolute and relative numbers of successfully concluded and interrupted overtaking maneuvers, are determined as evaluation variables exactly as the average and maximum speed at overtaking maneuver termination and the average duration of concluded overtaking maneuvers. These evaluation variables are merged together with the statistical visual range information, with an optional weighting, in order to form an overtaking suitability value for the route section. The overtaking suitability value is ideally normalized, for example limiting it to a certain interval, wherein high values indicate a high tendency towards overtaking while low values indicate a low tendency towards overtaking.

The determined overtaking suitability values associated to route sections are transmitted, at step S6, for example after each updating and/or cyclically and/or on demand, to motor vehicles provided with a driver assistance system for assisting the driver in an overtaking maneuver. These data are then used correspondingly in step S7.

It is particularly advantageous if, in this context, the overtaking suitability values are added to digital map data, associated to the route sections, of a navigation system, or if upon updating they replace overtaking information therein. From there, the overtaking information may be particularly easy to access. The overtaking information are used for outputting supporting indications for the driver, in particular overtaking recommendations and/or overtaking warnings, which are described in more detail in the following.

FIG. 2 shows a system 1, in which the inventive method may be implemented. The system 1 comprises the already described central computing device 2 (backend), which comprises a storage device 3 for received route data and an evaluation unit 4 for statistical evaluation of route data. The central computing device 2 communicates with a fleet of data acquisition motor vehicles, only data acquisition motor vehicles 5, 6 and 7 being schematically shown here for illustrative purposes.

The data acquisition motor vehicle 5, which, by the way, is an inventive motor vehicle 8, is illustrated in further detail as an example. It has a driver assistance system 9 for assisting the driver in an imminent overtaking maneuver. The driver assistance system 9 is associated to a control device 10, which provides both the functions of acquisition and transmission of route data and assistive functions. In order to receive route data, the control device 10 is connected to a plurality of vehicle systems, in order to determine operating data of the motor vehicle 8 (regarding overtaking maneuvers) or optionally in order to receive previously evaluated sensor data from environmental sensors, with reference to the determination of a visual range information. Purely for illustrative purposes the environmental sensors are shown as radar sensors 11 and a camera 12.

A communication link 14 to the computing device 2 may be established through a communication device 13, both for transmitting route data to the computing device 2 and for obtaining overtaking information from the computing device 2. The overtaking information associated to route sections may be stored among digital map data of a navigation system 15 of the motor vehicle.

The control device 10 also communicates with at least one output means 16, such as a display device and/or an acoustic indicator, in order to output overtaking suitability messages, referred to route sections, in particular overtaking recommendations and/or overtaking warnings.

A possible optical output of overtaking information comprising an overtaking suitability value is explained in FIG. 3. Here, a map representation 17 is shown, which shows the current position of a motor vehicle 18 on the currently traveled route, with an impeding route part 19. The route part 19 is evidently subdivided into route sections 20 to 25, which are presented in different colors, illustrated here by different hatchings, which indicate the overtaking suitability. If the overtaking suitability value exceeds a first threshold, then a high overtaking suitability value is present, so that the corresponding route sections, in this case route sections 20 and 24, are shown in green color. The route section 20 offers an unobstructed view of the opposite lane, despite the curve; the route section 24 is flat and straight and also offers a good view on the opposite lane.

If the overtaking suitability value is within an interval between the first and a second lower threshold, then an average overtaking suitability value is present, so that the corresponding route sections, in this case route sections 22 and 23, are shown in yellow. The route section 22 is straight, but has bumps, which obstruct the view on the opposite lane.

If the overtaking suitability value drops below the second threshold, then the route section is particularly unsuitable for overtaking, so that it is shown in red, here route sections 21 and 25, which in the present case are unfavorable due to the presence of curves and obstructed views. In this case, in particular, many interrupted overtaking maneuvers could have been recorded.

Other output variants may obviously also be conceived, such as the output of warnings in case of a detected overtaking intent in an unsuitable route section, or indications about when a route section particularly suitable for overtaking will be reached.

The invention claimed is:

1. A method, using a driver assistance system, for determining a suitability of an overtaking maneuver, wherein the suitability of the overtaking maneuver is output to a driver of a motor vehicle, comprising:
   receiving, by a motor vehicle-external central computing device, route data which at least in part relates to a plurality of route sections along a route and which influences the determination of the suitability of the overtaking maneuver on a route section of the plurality of the route sections, the route data being determined by a plurality of data acquiring motor vehicles during a driving process along the route;
   statistically evaluating the route data assigned to the route section by the plurality of data acquiring motor vehicles to thereby determine the overtaking suitability information of the route section;
   determining an overtaking suitability value based on an absolute number of successful overtaking attempts and an absolute number of interrupted overtaking attempts, wherein the overtaking suitability value is associated with the route section; and
   providing the overtaking suitability information to a plurality of motor vehicles which have the driver assistance system for assisting the driver with respect to the overtaking maneuver,
   wherein the overtaking suitability information comprises the overtaking suitability value associated with the route section,
   wherein the overtaking suitability information associated with the route section is stored in digital map data of a navigation system of a respective motor vehicle from the plurality of motor vehicles, and
   wherein the route data are determined as operating data of the plurality of data acquiring motor vehicles determined during the overtaking maneuver of the plurality of data acquiring motor vehicles and/or maneuver data derived therefrom.

2. The method of claim 1, wherein receiving the route data includes receiving visual range information describing a visual range of environmental sensors of the plurality of data acquiring motor vehicles directed towards a forward region along the route.

3. The method of claim 2, wherein receiving the visual range information includes taking into account an environmental model merging sensor data of a plurality of environmental sensors and/or depending on a farthest visible object and/or depending on a maximum distance, at which an itinerary may be derived from the sensor data.

4. The method of claim 2, wherein providing the overtaking suitability information includes displaying a higher determined visual range as more suitable for the overtaking maneuver.

5. The method of claim 1, wherein receiving the route data includes receiving data for concluded overtaking maneuvers and for interrupted overtaking maneuvers.

6. The method of claim 1, further comprising:
   applying at least one classifier on operating data describing a last trajectory traveled, the operating data comprising speed and acceleration data, so as to recognize the overtaking maneuver.

7. The method of claim 1, wherein the determining the overtaking suitability value comprises:
   determining the overtaking suitability value based on the absolute number of successful overtaking attempts with a first weight and the absolute number of interrupted overtaking attempts with a second weight.

8. The method of claim 1, wherein receiving the route data includes receiving the route data including a current position and/or a driving direction of a data acquisition motor vehicle from the plurality of data acquisition motor vehicles.

9. The method of claim 8, wherein determining the overtaking suitability information includes determining the overtaking suitability information with reference to a driving direction.

10. The method of claim 1, wherein determining the overtaking suitability information includes determining the overtaking suitability information with reference to a driving direction.

11. The method of claim 1, wherein providing the overtaking suitability information includes outputting the overtaking suitability information in a map representation.

12. The method of claim 11, further comprising:
    determining an overtaking probability from a current operating data of the motor vehicle; and
    outputting an overtaking recommendation for a determined route section depending on the overtaking probability.

13. The method of claim 12, further comprising:
    recognizing an overtaking intention on an unsuitable route section preceding a more suitable route section; and
    outputting an overtaking warning depending on the recognized overtaking intention.

14. The method of claim 11, further comprising:
    recognizing an overtaking intention on an unsuitable route section preceding a more suitable route section; and
    outputting an overtaking warning depending on the recognized overtaking intention.

15. The method of claim 1, further comprising:
    determining an overtaking probability from a current operating data of the motor vehicle; and
    outputting an overtaking recommendation for a determined route section depending on the overtaking probability.

16. The method of claim 15, further comprising:
    recognizing an overtaking intention on an unsuitable route section preceding a more suitable route section; and
    outputting an overtaking warning depending on the recognized overtaking intention.

17. The method of claim 1, further comprising:
    recognizing an overtaking intention on an unsuitable route section preceding a more suitable route section; and
    outputting an overtaking warning depending on the recognized overtaking intention.

18. A motor vehicle comprising:
    a communication device configured to communicate with a motor vehicle-external central computing device;
    a driver assistance system configured to assist a driver of the motor vehicle with respect to an imminent overtaking maneuver; and
    a control apparatus configured to:
        determine, while driving along a route, route data, which are at least partially referred to route sections, and which influence an evaluation of a potential overtaking suitability on a route section,
        transmit the route data to the computing device, wherein the route data are determined as operating data of the motor vehicle determined during an overtaking maneuver of the motor vehicle and/or maneuver data derived therefrom, and provide the driver with an overtaking recommendation regarding the imminent overtaking maneuver, wherein the overtaking recommendation is based on an overtaking suitability information received at the communication device from the motor vehicle-external central computing device, and wherein the overtaking suitability information comprises an overtaking suitability value associated with the route section, wherein the overtaking suitability value is determined based on an absolute number of successful overtaking attempts and an absolute number of interrupted overtaking attempts, wherein the overtaking suitability value is associated with the route section, and wherein the overtaking suitability information is determined from statistically evaluating the route data assigned to the route section by a plurality of data acquiring motor vehicles.

* * * * *